United States Patent
Mueller et al.

(10) Patent No.: US 9,243,701 B2
(45) Date of Patent: Jan. 26, 2016

(54) POWER-SPLIT TRANSMISSION FOR A TRACTION DRIVE AND METHOD FOR CONTROLLING THE TRANSMISSION

(71) Applicant: Dana Rexroth Transmission Systems, Arco (IT)

(72) Inventors: Matthias Mueller, Cernusco Sul Naviglio (IT); Walter Scandella, Bergamo (IT); Steffen Mutschler, Neu-Ulm (DE)

(73) Assignee: Dana Rexroth Transmission Systems, Arco (TN) (IT)

( * ) Notice: Subject to any disclaimer, the term of this patent is extended or adjusted under 35 U.S.C. 154(b) by 45 days.

(21) Appl. No.: 14/182,584

(22) Filed: Feb. 18, 2014

(65) Prior Publication Data

US 2014/0236433 A1 Aug. 21, 2014

(30) Foreign Application Priority Data

Feb. 19, 2013 (EP) ..................................... 13155719

(51) Int. Cl.
| | |
|---|---|
| *B60W 10/103* | (2012.01) |
| *F16H 41/24* | (2006.01) |
| *F16H 61/462* | (2010.01) |
| *F16H 61/431* | (2010.01) |
| *F16H 61/47* | (2010.01) |

(52) U.S. Cl.
CPC .............. *F16H 41/24* (2013.01); *F16H 61/462* (2013.01); *F16H 61/431* (2013.01); *F16H 61/47* (2013.01)

(58) Field of Classification Search
CPC ....... F16H 47/04; F16H 61/431; F16H 61/47; F16H 61/4061; F16H 61/478; B60W 10/103

USPC ................................. 701/51; 477/52, 68, 115
See application file for complete search history.

(56) References Cited

U.S. PATENT DOCUMENTS

| | | |
|---|---|---|
| 5,177,964 A | 1/1993 | Tanaka et al. |
| 2002/0026275 A1 | 2/2002 | Manken et al. |
| 2010/0083652 A1* | 4/2010 | Fukuda et al. .................. 60/487 |

(Continued)

FOREIGN PATENT DOCUMENTS

| | | |
|---|---|---|
| DE | 28 23 559 A1 | 12/1979 |
| DE | 32 47 287 A1 | 7/1983 |

(Continued)

OTHER PUBLICATIONS

Bosch Rexroth Corporation; Axial Piston Variable Motor A6VM; RA-A 91610/01.12 Data Sheet; Jan. 2012; USA, 80 pages.

(Continued)

*Primary Examiner* — Roger Pang
(74) *Attorney, Agent, or Firm* — Maginot, Moore & Beck LLP (57) ABSTRACT

A power-split transmission for a traction drive includes a hydraulic power branch and a further power branch. In order to control a velocity, a displacement volume of a hydraulic pump of the hydraulic power branch is configured to be adjusted by a hydraulic actuating device. For the purpose of adjustment, a control pressure medium can be applied to the actuating device by a control valve. An additional pressure-control device is configured to be used to set a control pressure of the control pressure medium to a setpoint value which is dependent on a drive range of the transmission or of the traction drive.

14 Claims, 4 Drawing Sheets

(56) References Cited

U.S. PATENT DOCUMENTS

| | | | |
|---|---|---|---|
| 2012/0152640 A1* | 6/2012 | Mori et al. ................... | 180/307 |
| 2012/0152641 A1* | 6/2012 | Takahashi et al. ............ | 180/307 |
| 2013/0168179 A1* | 7/2013 | Will et al. .................... | 180/338 |
| 2014/0129114 A1* | 5/2014 | Nishimura ................... | 701/102 |

FOREIGN PATENT DOCUMENTS

| | | |
|---|---|---|
| DE | 34 41 185 A1 | 5/1986 |
| DE | 195 24 669 A1 | 1/1997 |
| DE | 196 42 503 A1 | 5/1997 |
| DE | 10 2007 037 107 A1 | 2/2008 |
| DE | 10 2007 037 664 A1 | 2/2008 |
| DE | 10 2010 030 262 A1 | 12/2011 |
| EP | 0 497 293 A1 | 8/1992 |
| EP | 1 610 040 A1 | 12/2005 |
| EP | 1 927 762 A1 | 6/2008 |
| EP | 2 123 948 A1 | 11/2009 |

OTHER PUBLICATIONS

Bosch Rexroth AG, Axial Piston Variable Pump A4VG, Data Sheet, Dec. 2011, RE 92004/12.11, Elchingen, Germany (68 pages).

* cited by examiner

POWER-SPLIT TRANSMISSION FOR A TRACTION DRIVE AND METHOD FOR CONTROLLING THE TRANSMISSION

This application claims priority under 35 U.S.C. §119 to patent application no. EP 13 155 719.1, filed on Feb. 19, 2013 in Europe, the disclosure of which is incorporated herein by reference in its entirety.

BACKGROUND

The disclosure relates to a power-split transmission for a traction drive and to a method for controlling the transmission.

Power-split transmissions of the generic type for a traction drive, in particular of a mobile working machine, for example of a wheel loader, have not only a mechanical power branch which can be operated with a fixed transmission ratio or with a variable transmission ratio but also a further power branch. The latter is embodied as a hydraulic transmission branch having a hydraulic pump and a hydraulic motor in a closed hydraulic circuit. At least the hydraulic pump is embodied here with an adjustable displacement volume, with the result that the entire transmission ratio of the power-split transmission is infinitely variable by means of the hydraulic transmission branch. Both power branches can be combined here by means of a summing section of the transmission and in this way they act on a common output shaft of the transmission. Both power branches can be coupled or are coupled via a transmission input shaft to a drive machine of the traction drive, for example to a combustion engine, in particular a diesel engine.

In previous transmissions, the displacement volume has been adjusted by means of an electromagnetically activated 4/3-way proportional directional control valve with mechanical feedback, which valve is actuated electromagnetically by a control device of the transmission or of the traction drive. For example, an accelerator pedal or a joystick of the traction drive is connected as a setpoint value transmitter of a velocity to the control device. The setpoint value of the velocity determines here the actuating current which is transferred to the 4/3-way proportional directional control valve, and in this way the quantity of control pressure medium which is applied to an actuating device in order to adjust the displacement volume of the hydraulic pump. Feedback of the current velocity to the control device takes place by means of a rotational speed sensor. Power-split transmissions of the generic type are presented, for example, in laid-open patent applications DE 10 2007 037 107 A1 and DE 10 2007 037 664 A1.

A purely hydraulic drive range in which the transmission of power takes place only via the hydraulic power branch and the mechanical power branch is decoupled is particularly suitable for a working operating mode of the vehicle in which only low speeds are required but a drive torque has to be adjustable over wide ranges. A power-split drive range or a purely mechanical drive range are, on the other hand, predominant suitable for the drive operating mode with restricted dynamics with respect to velocity and traction force or with a virtually constant operating point.

A disadvantage of the known solutions is that the transmissions cannot be adapted flexibly enough to these different requirements of the drive ranges. It is therefore possible, for example, for suddenly increasing loads to occur in a drive range with a low speed if a wheel loader penetrates heavy bulk material with its shovel. Actuating times of conventional, electro-proportional volume flow controllers are then frequently too slow to prevent the drive machine from stalling at this relatively unstable operating point.

An alternative, likewise customary way of controlling the control pressure of the pump makes it possible to react to such load increases but gives rise to a limited controlling capacity of the speed in the power-split ranges.

In contrast with the above, the disclosure is based on the object of providing a power-split transmission for a traction drive, which can be adapted better to drive-range-specific requirements. Furthermore, the disclosure is based on the object of providing a control method for such a transmission.

SUMMARY

The first object is achieved by means of a power-split transmission having the features disclosed herein, and the second object is achieved by a method as disclosed herein.

Advantageous refinements of the disclosure are described in the dependent claims.

A power-split transmission for a traction drive, in particular of a mobile working machine, for example of a wheel loader, has an input shaft which can be coupled to a drive machine of the traction drive. Furthermore, it has a hydraulic power branch having a hydraulic pump which can be coupled, in particular is coupled, to the input shaft and which is embodied with an adjustable displacement volume. The hydraulic power branch also has a hydraulic motor which can be fluidically connected to the hydraulic pump via a first and a second working line, with the result that the pump and the motor can be operated in a closed hydraulic circuit. As has already been explained above, the entire transmission ratio of the power-split transmission is infinitely variable by means of the hydraulic power branch. In addition, the transmission has a further, in particular mechanical, power branch which can also be coupled, in particular is coupled, to the input shaft. By means of an, in particular proportional, particularly preferably electro-proportional control valve of the transmission, control pressure medium can be applied to a hydraulic actuating device of the hydraulic pump as a function of a velocity setpoint value in order to adjust a displacement volume of the hydraulic pump. In this context, the hydraulic pump is configured in such a way that a working pressure of the hydraulic motor or a pressure derived therefrom is effective in the direction of reducing the displacement volume. According to the disclosure, the transmission has a pressure-control device by means of which a control pressure of the control pressure medium can be set or adjusted to a setpoint value dependent on a drive range of the transmission or traction drive. An actuating of the pressure-control device in particular is done by a control device of the transmission or of the traction drive.

Since drive ranges are defined, in particular by means of a requested torque and requested adjustment dynamics of the displacement volume and therefore of the transmission ratio, and both variables depend essentially on the control pressure made available by the actuating device, by virtue of the setting of the control pressure according to the disclosure a transmission is provided which can easily be adapted in technical device terms to drive-range-specific requirements.

The input power which can be split into the hydrostatic power branch and the mechanical power branch can preferably be summed by means of a summing section to form an output power of the transmission. The transmission is preferably of an input-coupled design, wherein the branching arrangement is embodied by means of a gearwheel stage and the summing section is embodied by means of a planetary gear mechanism. In this case, a fixed rotational speed ratio occurs at the branching arrangement, and a fixed torque ratio occurs at the summing arrangement. As an alternative to this, the transmission is of output-coupled design, wherein the branching arrangement is embodied by means of a planetary gear mechanism, and the summing section is embodied by means of a gearwheel stage. A fixed torque ratio then occurs at the branching arrangement, and a fixed rotational speed ratio occurs at the summing arrangement. As an alternative to this, the transmission can have a mixed architecture based on these concepts.

The transmission preferably has an outer power branching design.

The transmission can preferably be connected to a control pressure medium source with an essentially constant supply pressure, in particular with a pressure medium outlet of a pressure-reducing valve which can be connected to a feed pump. As an alternative to or in addition to the pressure-reducing valve, the supply pressure can be set by means of a pressure-limiting valve. The supply pressure is preferably more than 25 bar.

It is preferred that the pressure-control device is arranged in a pressure-medium-flow path via which the control pressure medium source, in particular the pressure-reducing valve, can be connected to the hydraulic actuating device of the hydraulic pump.

The pressure-control device is preferably arranged fluidically in series upstream of the control valve, with the result that the control pressure is firstly set to the setpoint value which is dependent on the drive range, before the actuating device is supplied with the control pressure medium via the control valve. Apart from the case of a fully opened control valve, when, for example, a high velocity and, associated therewith, a large displacement volume of the hydraulic pump driving the hydraulic motor are requested, the control pressure medium volume flow which emerges from the pressure-control device is throttled once more by the control valve before it passes into the actuating device. As an alternative to this it is conceivable to provide the series arrangement in an inverted fashion.

The working pressure corresponds preferably to the pressure in that working line via which, in the assigned drive range, an inflow is formed from the hydraulic pump to the hydraulic motor.

The hydraulic pump is preferably configured in such a way that it can drive the hydraulic motor in both directions of travel, with the result that each of the working lines can be embodied as an inflow or as a return flow depending on the direction of travel.

The setpoint value of the control pressure is preferably determined as a function of at least one of the following conditions: a maximum permissible power consumption of the hydraulic power branch; a maximum permissible reduction rate of a rotational speed of the drive machine, in particular in order to avoid the drive machine stalling; a maximum permissible torque, in particular in order to avoid damage to the transmission or to the traction drive; or a maximum permissible acceleration of the vehicle or of the output shaft, in particular in order to ensure a jolt-free, gentle driving operation. The large potential of the inventive setting of the control pressure for the purpose of adaptation to the drive range is clearly apparent by virtue of these conditions. The determining process is preferably carried out by means of the already mentioned control device of the transmission or traction drive.

According to the preceding description, a direct hydraulic feedback of the instantaneously acting drive load with the effect of reducing the displacement volume is provided by means of the working pressure. In contrast, the actuating device to which the control pressure medium is applied acts with the effect of increasing the displacement volume. In a state of equilibrium, when the control pressure and the counteracting working pressure result in an adjustment torque of zero, the displacement volume remains constant. The control pressure which counteracts the working pressure is therefore a measure of the working pressure from which the displacement volume of the hydraulic pump starts to be reduced. In other words, by setting the control pressure it is possible to limit the working pressure and therefore a torque, and therefore also a power level at a given rotational speed.

The lower the setpoint value or the control pressure which is set accordingly here, the quicker the displacement volume can be reduced in the case of load peaks. The controlling speed which can be achieved in this context exceeds that of a conventional electro-proportional volume flow controlling means, with the result that the abovementioned conditions can be met more reliably.

By means of the pressure-control device according to the disclosure, the maximum supply pressure can therefore be made available as a control pressure, for example in drive ranges in which speed adjustment combined with high actuation dynamics is required. In other drive ranges in which, for example, only low speeds are required but increased driving resistances can suddenly occur, for example during working travel, the control pressure can be set to a low level. As a result of the lower level and the direct hydraulic feedback of the working pressure to the adjustment, the drive machine of the traction drive can therefore be protected better against stalling since the displacement volume, and with it the torque of the input shaft, can be reduced more quickly compared to the prior art.

The drive range is preferably defined by means of an interval of a transmission ratio of an output rotational speed of the transmission to a rotational speed of the input shaft of the transmission, which corresponds to a speed interval of the traction drive. In the drive range, precisely one power branch or a plurality of power branches can contribute to the output power of the transmission. In the first-mentioned case, the drive range is referred to as unsplit, and in the last-mentioned case it is referred to as power split. Intervals can overlap or can be separated from one another.

The hydraulic pump is preferably embodied as an adjustable axial piston pump of a swashplate design. The latter has working pistons which circulate with a drive shaft and which are supported on a swashplate which can be swivelled about a swivel axis. The drive shaft can be coupled, in particular is coupled, preferably to the input shaft of the transmission. The swashplate of the actuating device is preferably coupled in an articulated fashion at a distance from the swivel axis. Hydraulic working spaces of the axial piston pump, which are bounded by the working pistons, can alternately be placed in a pressure-medium-conducting connection via a cam plate, penetrated by at least two passages, in particular pressure kidneys, to a low pressure connection and to a high pressure connection of said axial piston pump and to the working lines described above, via said connections.

So that, as already mentioned, the hydraulic motor can be driven in both travel directions, the adjustable axial piston pump is preferably of swivable design, so that the swash plate can be swivelled to both sides of the swash plate. In this design, the possibility of the working pressure or the pressure derived therefrom being effective, as already mentioned, in the direction of the reduction of the displacement volume is preferably achieved in technical device terms by virtue of the fact that a cross-sectional area of at least one of the pressure kidneys is arranged distributed unequally on the two sides of a plane spanned by the rotational axis and the swivel axis. This is implemented most simply by a cam plate which is arranged twisted about the longitudinal axis. As a result, supporting forces, acting on the swashplate, of the working pistons with respect to the plane, or to the swivel axis, are no longer equalized but instead result in a restoring swivelling torque and the resulting supporting force of the working pistons is therefore effective in the direction of reducing the displacement volume. The greater the degree of twisting, the larger the restoring torque.

The actuating device is preferably embodied as a double-acting synchronizing cylinder with two working spaces which are separated by the piston thereof and are effective in opposite directions. The piston is preferably prestressed by means of two springs in a neutral position corresponding to the neutral position of the hydraulic pump, in particular of the swash plate. The synchronizing cylinder is preferably configured here in such a way that in the case of adjustment only one of the springs is ever effective.

The piston of the synchronizing cylinder can be coupled, in particular is coupled, to a valve body of the control valve, preferably via a coupling device, in particular a coupling linkage or a coupling spring, in order to feed back the set displacement volume, in particular the position of the swashplate.

The transmission is configured in a particularly flexible way if, in one refinement of the transmission, the hydraulic pump and the hydraulic motor are configured in such a way that they can be operated both in the pump operating mode and in the motor operating mode.

Since a rotational speed of the input shaft of the transmission is an important indicator of stability of an operating point of the drive machine, in one advantageous refinement the control pressure can be set by means of the pressure-control device as a function of a rotational speed of the input shaft or a rotational speed which can be derived therefrom and which is, in particular, a rotational speed of the drive machine. This is preferably done by means of the control device.

For this purpose, the transmission preferably has a rotational-speed-sensing unit by means of which the rotational speed of the input shaft or the rotational speed which can be derived therefrom can be sensed.

In order to be able to adapt the transmission even better to the requirements of the drive range, in one advantageous refinement the control pressure can additionally be set by means of the pressure-control device as a function of the working pressure or the pressure derived therefrom. This is preferably done by means of the control device.

In an alternative variant to this, the control pressure can be set by means of the pressure-control device only as a function of the drive range and of the working pressure or of the pressure derived therefrom, with the result that the rotational speed at the setpoint value consequently fails to be taken into account.

In order to sense the working pressure or the derived pressure, the transmission preferably has at least one pressure-sensing unit.

In one preferred refinement, the drive range as a function of which the setting according to the disclosure takes place is purely hydrostatic or it is power split and the hydraulic pump operates in the pump operating mode.

A rotational speed range of the input shaft is preferably in the hydrostatic or predominantly hydrostatic drive range of the intended working travel of the traction drive. The working travel is defined here by a low velocity and/or by a low transmission ratio of the transmission and/or by activating an implement of the vehicle which has the traction drive. In particular when an implement is used, a sudden rise in the external load and therefore in the working pressure can occur in the drive operating mode, wherein the control pressure can then preferably be set to a small setpoint value, which prevents the drive machine from stalling.

The pressure-control device preferably has a pressure medium inlet which can be connected to a control pressure medium source, in particular to a pressure medium outlet of a pressure-reducing valve which is connected to a feed pump, and a pressure medium outlet, which can be connected, in particular is connected, to a pressure medium inlet of the control valve.

In one particularly preferred refinement, the pressure-control device is embodied by means of a pressure-control valve, in particular a pressure-reducing valve, or has the latter. The pressure-control valve or pressure-reducing valve has here as advantages a design which is simple in terms of device technology and a stable and rapid controlling behaviour. The pressure-control valve can preferably be activated proportionally, in particular electromagnetically proportionally, in particular by means of the control device.

In one preferred refinement, a valve body of the pressure-control valve can be pre-stressed, in particular by means of a spring, into a blocking position, with the result that when a control energy supply fails a control pressure medium is no longer made available via the pressure-control valve and the displacement volume can be reduced as far as zero by the working pressure which is effective in a resetting manner. In this way, an output rotational speed of the hydraulic power branch is zero in the case of failure of the control energy, and the drive comes to a standstill at least in the purely hydraulic drive range. In contrast, in the opening direction a pressure equivalent which corresponds to the setpoint value can be applied to the valve body, along with an actual value of the control pressure which is present at the pressure medium outlet of said valve body. By means of the pressure-control valve which is embodied in this way, purely hydraulic, rapid and safe adjustment of the control pressure takes place. If the pressure-control valve can be activated electromagnetically, a setpoint value signal in the form of an actuating current of an electromagnet of the pressure-control valve corresponds to the setpoint value.

In one particularly preferred refinement, the transmission has a control device which is configured in such a way that the setpoint value can be determined by means of said control device and the pressure-control device can be actuated with a setpoint value signal. Thereby, the setpoint value can preferably be determined as a function of at least one of the four conditions already enumerated.

The control device can preferably be connected, in particular is connected, in a signal-transmitting fashion to the control valve and to the pressure-control device, with the result that it can be used to carry out both the control of the control valve and the setting of the control pressure.

In one particularly advantageous refinement of the transmission, the control device is configured in such a way that it can be used, in particular via its actuation of the pressure-control device according to the setpoint value and its actuation of the control valve according to the velocity setpoint value, to limit a torque of the hydraulic pump and/or a power of the hydraulic pump.

In order to set the setpoint value by means of the control device, in one particularly preferred refinement, a characteristic map in which the setpoint value is stored as a function of the drive range and/or as a function of a rotational speed of the input shaft or a rotational speed which can be derived therefrom and/or as a function of the working pressure is stored in the control device.

The control device is preferably configured in such a way that it can be used to adjust the pressure-control device at least in drive ranges other than the hydrostatic or predominantly hydrostatic drive range into an, in particular, unregulated through-flow position with an essentially constant opening cross section.

The control device can advantageously be connected in a signal-transmitting fashion to a velocity signal generator. Thereby, said control device can be connected to the velocity signal generator directly or indirectly, for example via a control device of the traction drive or vehicle. The velocity signal generator is, for example, an accelerator pedal or joystick of the traction drive or vehicle.

It is preferred that the control valve be embodied as a continuously adjustable 4/3-way directional control valve with a spring-centred central blocking position and with a first supply position and a second supply position.

The pressure medium outlet of the pressure-control valve can be connected, in particular is connected, preferably via the first supply position to the first working space of the actuating device, and via the second supply position to the second working space of the actuating device. A tank or a sump can be connected, in particular is connected, preferably via the first supply position to the second working space of the actuating device and via the second supply position to the first working space of the actuating device. For safety reasons, preferably both working spaces of the actuating device can be connected, in particular are connected, to the tank in a throttled fashion by means of the central blocking position.

In one preferred refinement, the control device is configured in such a way that it can be used, in particular is used, to adjust the pressure-control device into an unregulated through-flow position, at least in a drive range other than the purely hydrostatic or predominantly hydrostatic drive range, as a result of which in this other drive range of the actuating device of the hydraulic pump the maximum control pressure, and therefore the full dynamics, are available at least when the supply position of the control valve is fully opened in order to adjust the displacement volume.

In a preferred refinement, the control device can additionally be connected in a signal-transmitting fashion to a travel direction signal generator of the traction drive or vehicle. Said travel direction signal generator preferably has the positions forward travel, reverse travel and idling.

In a further preferred refinement, the setpoint value can additionally be set by means of the pressure-control device as a function of the positions of the travel direction signal generator.

A method for setting the control pressure of a power-split transmission which is configured according to the preceding description has according to the disclosure steps "determining the drive range" and "setting the control pressure as a function of the determined drive range by means of the pressure-control device".

The method has the advantages already explained in detail for the transmission, the traction drive and the vehicle, for which reason the advantages will not be specified again at this point.

In one preferred refinement of the method, the step "setting the control pressure as a function of the determined drive range by means of the pressure-control device" comprises steps "sensing a rotational speed of the input shaft or a rotational speed which can be derived therefrom, by means of a rotational-speed-sensing unit", "determining the setpoint value of the control pressure as a function of the rotational speed", and "actuating the pressure-control device with a setpoint value signal".

In a simple refinement of the method, the step "determining the setpoint value as a function of the rotational speed" is carried out by means of a step "determining the setpoint value from a characteristic map". After this, the already mentioned step "transfer of the setpoint value signal of the control device to the pressure-control device" takes place.

Since, as already stated, a reduction in the control pressure entails a loss of adjustment dynamics of the already described actuating device and a loss of vehicle movement dynamics, it may be advantageous to correct the setpoint value which is determined from the characteristic map. Thereby, one preferred criterion as to whether this correction is advantageous for a current drive state is the currently present working pressure or the pressure derived therefrom. An advantageous refinement of the method therefore has a step "sensing the working pressure by means of a pressure-sensing unit". This step preferably has to be carried out here within a sufficiently short time interval including the step "sensing the rotational speed of the input shaft or the rotational speed which can be derived therefrom, by means of the rotational-speed-sensing unit". Subsequent to the step "determining the setpoint value from the characteristic map", in this refinement steps "determining a limiting working pressure from a characteristic map as a function of the rotational speed", "determining a deviation of the working pressure from the limiting working pressure" and "correcting the setpoint value as a function of the deviation" are then carried out. This is followed by the already mentioned step "actuating the pressure-control device with a setpoint value signal".

The steps "determining . . . " and "actuating . . . " preferably take place by means of the transmission control device described above.

This control device preferably has a memory unit in which a method which is configured according to the preceding description is stored for execution, and a processor unit by means of which the method can be carried out.

BRIEF DESCRIPTION OF THE DRAWINGS

In the text which follows, in each case one exemplary embodiment of a transmission and method according to the disclosure are explained in more detail with reference to five figures, of which.

DETAILED DESCRIPTION

For the sake of simpler orientation, in the text which follows the same reference symbols have been used for identical components over all of the figures.

Figure 1:
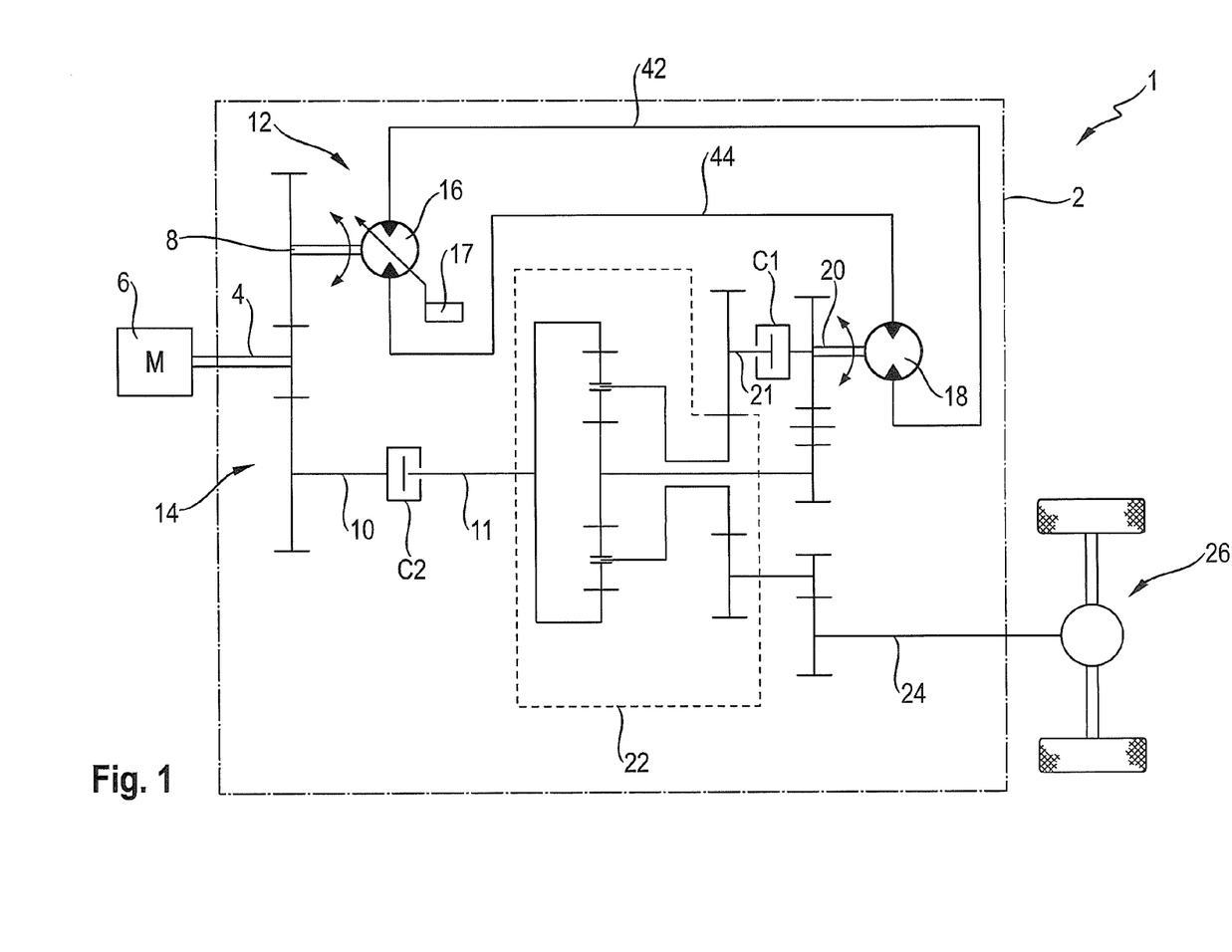
FIG. 1 shows a transmission diagram of an exemplary embodiment of a power-split transmission of a traction drive in a plan view.

According to FIG. 1, an input-coupled, power-split transmission 2 is provided in a traction drive 1 of a vehicle, for example of a wheel loader. The transmission 2 has an input shaft 4 which is connected to a drive engine or a drive machine 6 respectively. The latter is preferably embodied as an internal combustion engine, in particular as a diesel engine, and can be connected to a control device (not illustrated) of the traction drive. The input shaft 4 is connected to input shafts 8, 10 via a respective gearwheel pairing, wherein the input shaft 8 is assigned to a hydraulic power branch 12, and the input shaft 10 is assigned to a further, mechanical power branch 14. The hydraulic power branch 12 has an adjustable hydraulic pump 16 with a hydraulic actuating device 17 for adjusting its displacement volume and a hydraulic motor 18 of constant design, wherein the two are fluidically connected via a first and a second working line 42, 44 and can be operated as intended in a closed circuit. The hydraulic pump 16 is embodied as a swivable axial piston machine of a swashplate design with a twisted control cam, such as is shown, for example, in the data sheet RE 92004/12.11 of Bosch Rexroth AG. The hydraulic motor 18 is embodied as an axial piston machine of the swashplate design such as is shown, for example, in the data sheet RE 91610/01.12 of Bosch Rexroth AG. The hydraulic pump 16 is driven here by means of the input shaft 8. The hydraulic motor 18 has an output shaft 20. This output shaft can be connected via a first clutch C1 to a summing section 22 of the transmission 2. The summing section 22 is embodied here as a planetary gear mechanism.

The input shaft 10 of the mechanical power branch 14 can be connected via a second clutch C2 to the summing section 22. An output of the summing section 22 is connected to an output shaft 24 of the transmission 2, which output shaft 24 drives an axle unit 26 of the traction drive 1.

In a first, hydraulic drive range of the transmission 2, power transmission takes place from the drive machine 6 to the output shaft 24 only via the hydraulic, first power branch 12. For this purpose, the first clutch C1 is closed and the second clutch C2 is open. In a second, power-split drive range, the transmission of power takes place via both power branches 12, 14, wherein both clutches C1, C2 are closed. In a third drive range, the transmission of power takes place exclusively via the clutch C2 or the mechanical, second power branch 14.

For a detailed description of the traction drive 1, in particular of the design and the function of the transmission 2, reference is made, for the purpose of disclosure, to the laid-open patent applications DE 10 2007 037 107 A1 and DE 10 2007 037 664 A1. It is to be borne in mind here that the hydraulic motor shown there is, in contrast to the exemplary embodiments shown here, not of constant but rather of adjustable design.

Figure 2:
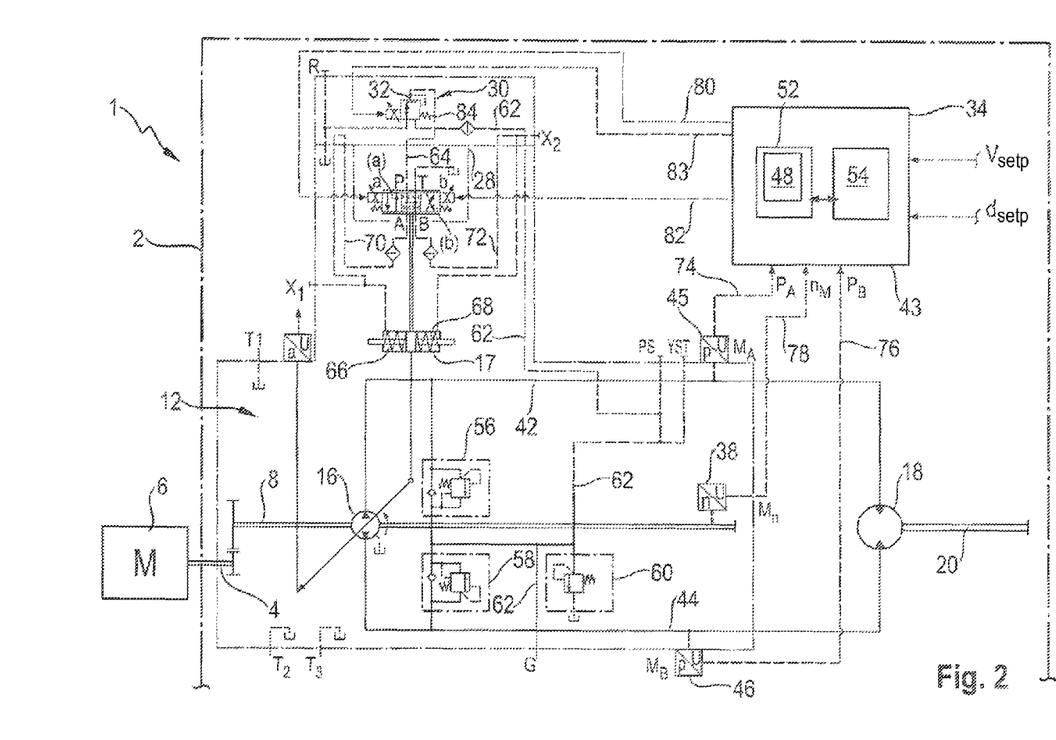
FIG. 2 shows a hydraulic circuit diagram of a hydrostatic branch of the transmission according to FIG. 1 in a view of a detail.

FIG. 2 shows a view of a detail of the transmission 2 according to FIG. 1 in order to illustrate the hydraulic power branch 12 in more detail. For reasons of clarity, there is no illustration of the mechanical power branch 14, the transmission summing section 22 and the axle unit 26 according to FIG. 1 here. The actuating device 17 is embodied as a double-acting synchronizing cylinder, wherein the piston thereof is coupled to a pivot cradle (not illustrated) of the hydraulic pump 16. The transmission has a control valve 28 which is configured as a 4/3-way proportional directional control valve which can be electromagnetically operated. Furthermore, the transmission 2 has a pressure-control device 30 which is configured as a pressure-reducing valve. In order to limit the working pressure $p_A$ or $p_B$ in the first and second working lines 42, 44, the transmission 2 has two pressure-limiting valves 56, 58 with a replenishing function. Thereby, the pressure-limiting valve 56 is connected to the first working line 42, and the pressure-limiting valve 58 is connected to the second working line 44. Units 45, 46 are connected to the working lines 42, 44 via measurement connections $M_A$, $M_B$.

Furthermore, a rotational-speed-sensing unit 38 is provided by means of which the rotational speed of the input shaft 8 of the hydraulic pump 16 can be sensed. The rotational speed of the input shaft 4 of the transmission 2 can be derived from the rotational speed which is sensed in this way. The hydraulic pump 16 also has a swivelling-angle-sensing unit.

The transmission 2 can be connected to a feed pump (not illustrated) via a control pressure connection G, which feed pump can apply control pressure medium to the control pressure connection G in an intended operating mode. A supply pressure $p_{St}$ is limited by means of a pressure-limiting valve 60 of the transmission 2 and is therefore approximately constant. In this exemplary embodiment, the value set at the pressure-limiting valves 56, 58 is 500 bar, and that of the pressure-limiting valve 60 is 35 bar. The supply connection G is connected via a supply line 62 to a pressure medium inlet of the pressure-control device 30. The pressure medium outlet 32 of said pressure-control device 30 is connected to a pressure connection P of the control valve 28 via a pressure medium line 64. Said control valve 28 has a tank connection T which is connected to a tank T. The control valve 28 has two working connections A, B, wherein the working connection A is connected to a first working space 66, and the second working connection B is connected to a second working space 68 of the hydraulic actuating device 17. Thereby, the connection is embodied in each case via a working line 70, 72.

The control valve 28 has a first supply position (a) in which its pressure connection P can be connected to the first working connection A, and its tank connection T can be connected to the second working connection B. Correspondingly, it has a second supply position (b) via which the pressure medium connections can be formed in a criss-cross fashion, that is to say P with B and T with A. The hydraulic pump 16 is configured in this exemplary embodiment in such a way that an application of pressure medium to the first working space 66 from a neutral position of the pivot cradle acts in the direction of enlarging the displacement volume, and the first working line 42 is then the inlet line of the hydraulic motor, and the second working line 44 is the return line thereof. When pressure medium is applied to the second working space 68 from the neutral position, the direction of flow and therefore the rotational direction of the hydraulic motor 18 are reversed, wherein the second working line 44 is then the inlet line, and the first working line 42 is the return line. According to the preceding description, the hydraulic machine 16 is embodied with a twisted control cam, with the result that the working pressure $p_A$ or $p_B$ in the respective inlet line is effective in the direction of reducing the displacement volume.

Furthermore, the transmission 2 has a control device 34 which is connected via signal lines 74, 76 to the pressure-sensing units 45, 46, and via a signal line 78 to the rotational-speed-sensing unit 38. Furthermore, a velocity setpoint value $v_{setp}$ and a travel direction setpoint value $d_{setp}$ are transmitted as input variables to the control device 34 via corresponding signal lines. The control device 34 has a memory unit 52 and a processor unit 54. A method 48 according to the disclosure is, as is described with respect to FIG. 3, stored in the memory unit 52 for execution. The execution takes place here in the processor unit 54. Furthermore, a characteristic map 43 and a correction field 114 according to FIG. 3 are stored in the memory unit 52.

For operating the control valve 28 into its supply positions (a), (b) the control device 34 is connected to electromagnets a, b of the control valve 28 via signal lines 80, 82. The control device 34 for inventively setting a setpoint value $p_{x\ setp}$ of the control pressure is connected to an electromagnet of the pressure-control device 30 via a further signal line 83. Thereby, a valve body of the pressure-control device 30 is prestressed into a blocking position by means of a spring 84, and is acted on in the opening direction with a pressure equivalent corresponding to the setpoint value $p_{x\ setp}$ and with an actual value of the control pressure which is present at its pressure medium outlet 32. The control device 34 is configured here in such a way that a method 48 according to the disclosure is stored therein for execution.

Figure 3:
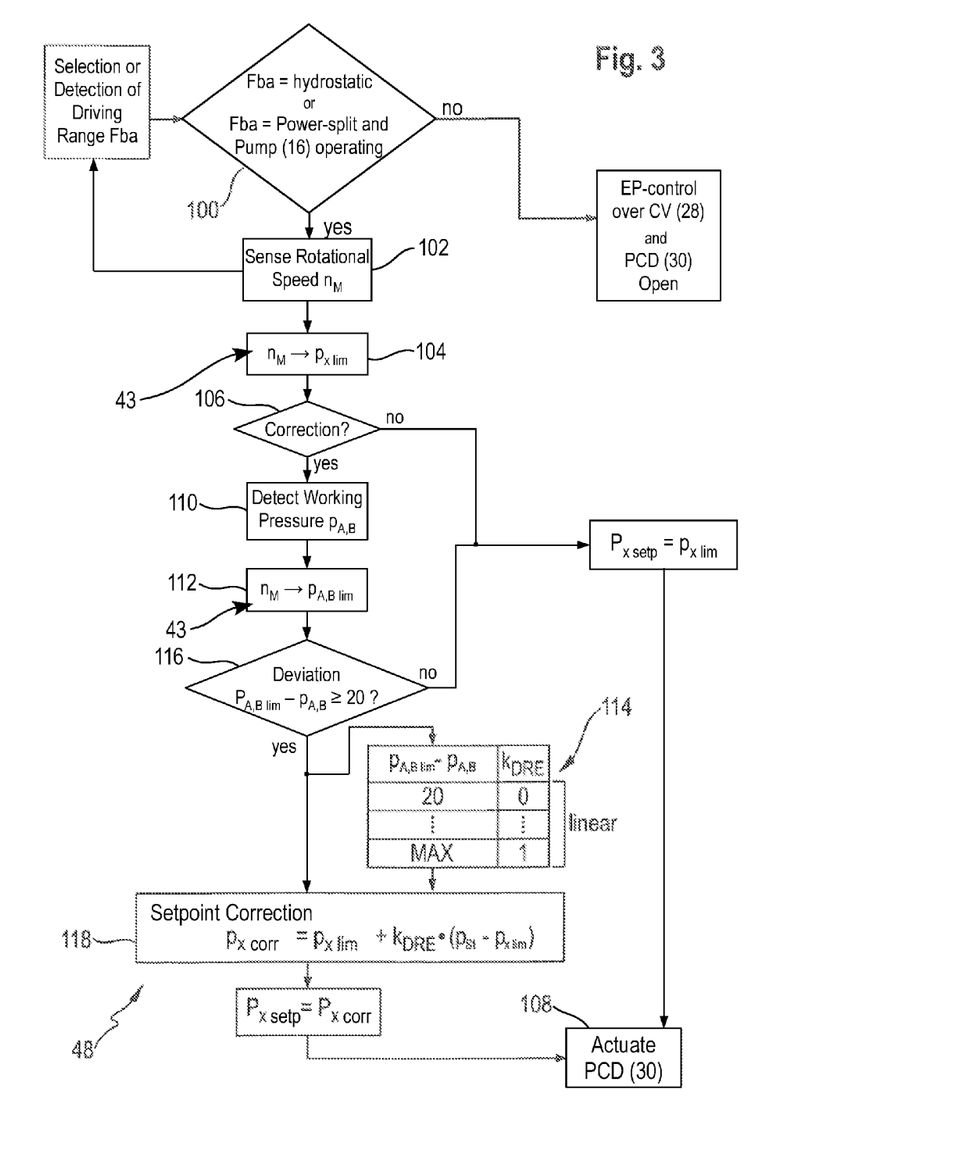
FIG. 3 shows a flowchart of an exemplary embodiment of a method.

The following description of the exemplary embodiment of the method is made with reference to FIGS. 2 and 3. The method 48 preferably begins with a step 100 in which an interrogation is made about the currently present or currently selected drive range of the transmission 2. Thereby, it is determined whether the drive range is embodied either hydrostatically or in a power-split fashion with a hydraulic pump 16 operating in the pump operating mode. If the drive range does not meet either of the two conditions, the control pressure is not set to a value which deviates from the predefined and essentially constant supply pressure, and the control of the application of pressure medium by the actuating device 17 according to FIG. 2 takes place exclusively in an electro-proportional fashion by means of the control valve 28 on the basis of the predefined setpoint values of the velocity $v_{setp}$ and the direction of travel $d_{setp}$. In this case, the pressure-control device 30 according to FIG. 2 is fully opened and does not regulate.

On the other hand, if the drive range is embodied in a correspondingly hydrostatic fashion, a step 102 takes place in which the rotational speed of the input shaft 8, from which the rotational speed of the input shaft of the transmission 2 can be derived, is sensed by means of the rotational-speed-sensing unit 38. In a subsequent step 104, a maximum permissible limiting control pressure $p_{x\ lim}$, which is assigned to the sensed rotational speed $n_M$, is then determined from a characteristic map 43 as a function of said sensed rotational speed $n_M$.

After this, a step 106 takes place in which it is interrogated whether this determined limiting control pressure $p_{x\ lim}$ of the pressure-control device 30 is to be transmitted as a control pressure setpoint value $p_{x\ setp}$ or whether it is to be increased in order to improve an actuation dynamic of the actuating device 17 in the direction of the supply pressure $p_{St}$. If the result of the interrogation is negative, a step 108 immediately takes place by means of which the control pressure setpoint value $p_{x\ setp}$ is transferred as a new setpoint value to the pressure-control device 30.

In contrast, if the interrogation in step 106 reveals that a correction is to be carried out, a step 110 in which the working pressure $p_A$ or $p_B$ is sensed in the working line which forms the inflow to the hydraulic motor 18 takes place approximately simultaneously with the step 102. In addition, a step 112 takes place in which a permissible maximum working pressure $p_{A,B\ lim}$ is determined from the characteristic map 43. Subsequent to the two steps, a step 116 takes place in which a deviation from $p_{A,B\ lim}$ and the sensed working pressure $p_A$ or $p_B$ is determined, which deviation is then compared with a reference value, in this case 20 bar. If the difference is below the reference value, the limiting control pressure $p_{x\ lim}$ which is determined up till then is transferred as a new setpoint value signal of the control pressure to the pressure-control device 30 by means of the step 108.

On the other hand, if the deviation is ≥20 bar, a correction factor $k_{DRE}$ is assigned to the deviation from a correction field 114, which correction factor $k_{DRE}$ is included in the calculation of a corrected control pressure $p_{Xcorr}$ in a subsequent step 118. In the following, this is then the new setpoint value $p_{x\ setp}$ with which the pressure-control device 30 is actuated.

Figure 4:
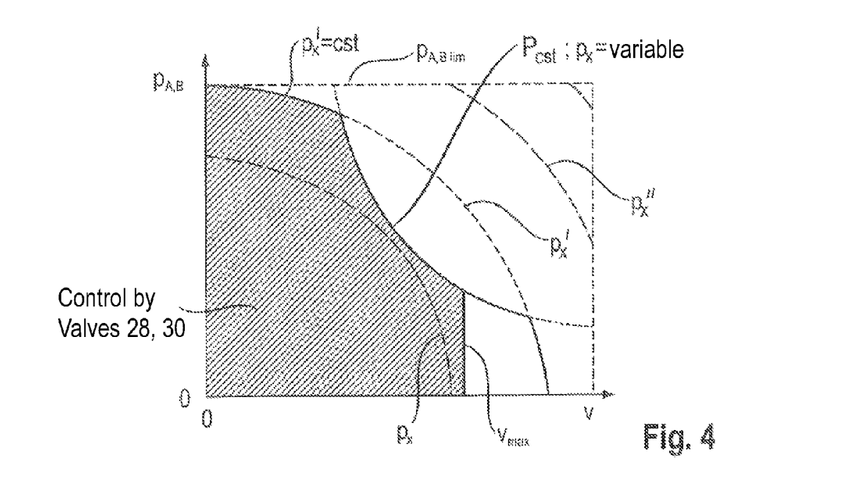
FIG. 4 shows a control characteristic map of the exemplary embodiments according to FIGS. 1 to 3.

FIG. 4 shows a control behaviour of the transmission 2 according to the disclosure in the preceding description in which, on the one hand, open-loop or closed-loop control of the velocity is carried out by means of the control valve 30, and, on the other hand, torque limitation and to this extent also power limitation take place by means of the pressure-control device 30. Both control processes therefore take place in a superimposed fashion. In the diagram according to FIG. 4, the working pressure $p_A$ or $p_B$ is plotted against the displacement volume V of the hydraulic pump 16. In this context, on the one hand, the maximum permissible limiting working pressure $p_{A,B\ lim}$ is characterized for the hydrostatic drive range and the maximum value is characterized for the displacement volume, by means of corresponding dashed lines. Likewise, curves of a constant control pressure $p_x$, $p_{x'}$, $p_{x''}$, are shown in the diagram. Thereby, the control pressure of $p_x$ increases in the direction $p_{x''}$. Furthermore, a curve of a maximum permissible power $P_{cst}$ is plotted in the diagram. This power curve is predefined, for example, by a vehicle control device.

In the region of the diagram which is illustrated with hatching, the pressure-control device 30 therefore limits the control pressure $p_x$ while at the same time the control valve 28 permits precise speed control as soon as the torque or the working pressure $p_A$ or $p_B$ is below the limiting curves. At the same time, the transmission 2 is protected against overloading.

Figure 5:
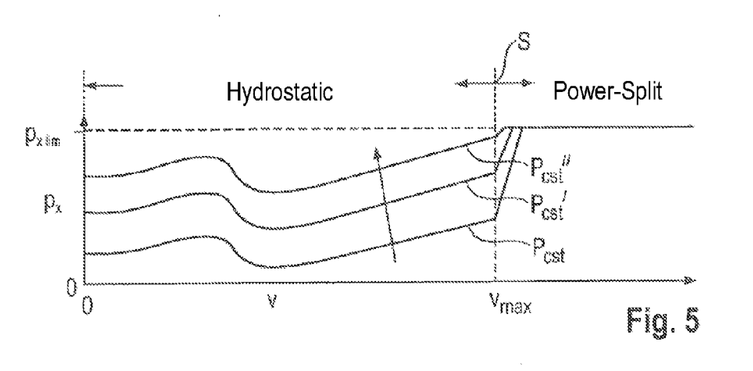
FIG. 5 shows a control pressure profile of the exemplary embodiments as a function of drive ranges

FIG. 5 shows a diagram in which the control pressure $p_x$ is illustrated plotted against the displacement volume V of the hydraulic pump 16. In the diagram, curves of a constant power $P_{cst}$ are illustrated, wherein the power increases in the indicated direction of the arrow. It is clearly apparent that as the displacement volume increases a power level which has to be maintained constantly requires a variation of the control pressure, which is brought about according to the disclosure by means of the pressure-control device 30 and the control device 34. In addition, the diagram illustrates the maximum permissible control pressure $p_{x\ lim}$ and the maximum displacement volume $V_{max}$ in the hydrostatic drive range. This drive range extends from a displacement volume V=0 to the displacement volume $V_{max}$ in the diagram. Beyond said displacement volume $V_{max}$, the transmission of power takes place in a power-split fashion, which means that both the hydrostatic and the mechanical power branches of the transmission 2 contribute to the transmission of power. In a junction region beyond a switching point S at which the mechanical power branch is engaged, the control pressure $p_x$ which is limited or adjusted by the pressure-control device 30 rises to its maximum value which corresponds to the supply pressure $p_{St}$ which is present at the supply connection G. In this way, a gentle drive range junction is provided.

A power-split transmission for a traction drive is disclosed, which transmission has a hydraulic power branch and a further power branch. In order to regulate a velocity, a displacement volume of a hydraulic pump of the hydraulic power branch can be adjusted by means of a hydraulic actuating device. For the purpose of adjustment, control pressure medium can be applied to the actuating device by means of a control valve here. A control pressure of the control pressure medium can be set by means of an additional pressure-control device to a setpoint value which is dependent on a drive range of the transmission or of the traction drive.

A method for setting the control pressure is also disclosed.

LIST OF REFERENCE SYMBOLS

1 Traction drive
2 Transmission
4 Input shaft

6 Drive machine
8 Input shaft, hydraulic power branch
10 Input shaft, mechanical power branch
12 Hydraulic power branch
14 Mechanical power branch
16 Hydraulic pump
17 Actuating device
18 Hydraulic motor
20 Output shaft
21 Input shaft
22 Summing section
24 Output shaft
26 Axle unit
28 Control valve
30 Pressure-control device
32 Pressure medium outlet
34 Control device
38 Rotational-speed-sensing unit
42 First working line
43 Characteristic map
44 Second working line
45, 46 Pressure-sensing unit
48 Method
52 Memory unit
54 Processor unit 56, 58 Pressure-limiting valve with replenishing function
60 Pressure-limiting valve supply pressure
62 Supply line
64 Pressure medium line
66 First working space
68 Second working space
70, 72 Working line
74, 76, 78 Signal line
80, 82, 83
84 Spring
100 Step for determining drive range
102 Step for sensing rotational speed
104 Step for determining setpoint value from characteristic map
106 Step for interrogating correction
108 Step for actuating pressure-control device
110 Step for sensing working pressure
112 Step for determining limiting working pressure from characteristic map
114 Correction field
116 Step for determining deviation
118 Step for correcting setpoint value
C1 First clutch
C2 Second clutch

What is claimed is:

1. A power-split transmission for a traction drive having a drive machine, comprising:
    an input shaft coupled to the drive machine of the traction drive;
    a hydraulic power branch including:
        a hydraulic pump coupled to the input shaft and including an adjustable displacement volume and a hydraulic actuating device configured to set the adjustable displacement volume;
        a hydraulic motor connected fluidically to the hydraulic pump via a first working line and a second working line;
        a pressure-control device including an inlet fluidly connected to a working pressure in one of the first and second working lines, and a pressure-medium outlet at which the pressure-control device is configured to set a control pressure of a control pressure medium to a setpoint value; and
        a control valve fluidly connected between the pressure medium outlet of the pressure-control device and the hydraulic actuating device of the hydraulic pump and configured to regulate application of the control pressure medium to the hydraulic actuating device as a function of a velocity setpoint value;
    a further power branch coupled to the input shaft in a power-split drive range and decoupled from the input shaft in a hydrostatic only drive range; and
    a control device operably connected to the pressure-control device and including a memory unit and a processor unit configured to execute programmed instructions stored in the memory unit to determine the setpoint value based on whether the transmission of the traction drive range is in the power-split drive range or the hydrostatic only drive range, produce a setpoint value signal corresponding to the setpoint value, and actuate the pressure-control device using the setpoint value signal.

2. The transmission according to claim 1, further comprising:
    a rotational speed sensor configured to sense a rotational speed of the input shaft,
    wherein the control device is operably connected to the rotational speed sensor and is further configured to determine the setpoint value as a function of the rotational speed of the input shaft or a rotational speed derived from the rotational speed of the input shaft.

3. The transmission according to claim 1, further comprising:
    a working pressure sensor configured to sense the working pressure in the one of the first and second working lines,
    wherein the control device is operably connected to the working pressure sensor and is configured to determine the setpoint value as a function of the working pressure or a pressure derived from the working pressure.

4. The transmission according to claim 1, wherein the control device is configured to determine the setpoint value and actuate the pressure-control device in the hydrostatic only drive range, or the power split drive range when the hydraulic pump is operating.

5. The transmission according to claim 1, wherein the pressure-control device includes a pressure-reducing valve.

6. The transmission according to claim 5, wherein:
    the pressure-reducing valve includes a valve body configured to be prestressed in a closed direction into a blocking position, and
    the control device is configured to actuate the pressure-reducing valve using the setpoint value signal so as to produce a pressure equivalent corresponding to the setpoint value, and
    the pressure-reducing valve is configured such that an actual value of the control pressure at the pressure medium outlet and the pressure equivalent are applied to the valve body in the opening direction of the valve body.

7. The transmission according to claim 1, wherein the control device is configured to limit at least one of (i) a torque of the hydraulic pump, and (ii) a power of the hydraulic pump.

8. The transmission according to claim 7, wherein the memory unit includes a characteristic map configured to store the setpoint value as a function of at least one of:
    whether the transmission or the traction drive is in the hydrostatic only drive range or the power split drive range, a rotational speed of the input shaft or a rotational speed which can be derived therefrom, and the working pressure.

9. The transmission according to claim 2, wherein the control device is further configured to obtain the rotational speed of the input shaft of the rotational speed derived from the rotational speed of the input shaft and determine the setpoint value from a characteristic map stored in the memory unit based upon the rotational speed of the input shaft or the rotational speed derived from the rotational speed of the input shaft.

10. The transmission according to claim 9, further comprising:

a working pressure sensor configured to sense the working pressure in the one of the first and second working lines;

wherein the control device is further configured to:

obtain the sensed working pressure at approximately the same time as obtaining the rotational speed of the input shaft or the rotational speed derived from the rotational speed of the input shaft; and after the determining the setpoint value from the characteristic map:

determine a limiting working pressure from the characteristic map as a function of the rotational speed of the input shaft or the rotational speed derived from the rotational speed of the input shaft;

determine a deviation of the working pressure from the limiting working pressure; and correct the setpoint value as a function of the deviation.

11. A method for setting a control pressure of a power-split transmission for a traction drive having a drive machine coupled to an input shaft, which is coupled to a hydraulic power branch and is coupled to a further power branch, the method comprising:

determining whether the transmission or the traction drive is in a hydrostatic only drive range, in which the further power branch is decoupled from the input shaft, or a power split drive range, in which the further power branch is coupled to the input shaft;

determining, with a control device, a setpoint value of a control pressure of a pressure control medium based upon the determined drive range;

generating, with the control device, a setpoint value signal based on the setpoint value;

actuating, with the setpoint value signal, a pressure-control device of the hydraulic power branch so as to set the control pressure at a pressure medium outlet of the pressure-control device to the setpoint value, the pressure-control device including an inlet fluidly connected to a working pressure in one of a first working line and a second working line, which connect a hydraulic motor of the hydraulic power branch to a hydraulic pump of the hydraulic power branch that is coupled to the input shaft and includes an adjustable displacement volume and a hydraulic actuating device configured to set the adjustable displacement volume; and regulating application of the control medium to the hydraulic actuating device as a function of a velocity setpoint value using a control valve fluidly connected between the pressure medium outlet of the pressure-control device and the hydraulic actuating device of the hydraulic pump.

12. The method according to claim 11, wherein the determining of the setpoint value comprises:

sensing a rotational speed of the input shaft or a rotational speed derived from the rotational speed of the input shaft, with a rotational-speed-sensing unit;

determining the setpoint value from a characteristic map stored in a memory unit of the control device as a function of the rotational speed of the input shaft or the rotational speed derived from the rotational speed of the input shaft.

13. The method according to claim 12, further comprising:

sensing the working pressure with a pressure-sensing unit at approximately the same time as the sensing of the rotational speed of the input shaft or the rotational speed derived from the rotational speed of the input shaft; and after the determining the setpoint value from the characteristic map:

determining a limiting working pressure from the characteristic map as a function of the rotational speed;

determining a deviation of the working pressure from the limiting working pressure; and correcting the setpoint value as a function of the deviation.

14. A method for setting a control pressure of a power-split transmission for a traction drive having a drive machine, comprising:

determining a drive range; and setting a control pressure as a function of the determined drive range with a pressure-control device by:

sensing, with a rotational-speed-sensing unit, (i) a rotational speed of an input shaft coupled to the drive machine of the traction drive or (ii) a rotational speed derived from the rotational speed of the input shaft;

at approximately at the same time as the sensing of the rotational speed of the input shaft or the rotational speed derived from the rotational speed of the input shaft, sensing the working pressure with a pressure-sensing unit;

determining a setpoint value from a characteristic map as a function of the rotational speed;

after the determining the setpoint value from the characteristic map:

determining a limiting working pressure from the characteristic map as a function of the rotational speed;

determining a deviation of the working pressure from the limiting working pressure; and correcting the setpoint value as a function of the deviation; and actuating the pressure-control device with the setpoint value signal, wherein the power-spilt transmission includes:

a hydraulic power branch including (i) a hydraulic pump coupled to the input shaft and including an adjustable displacement volume, (ii) a hydraulic motor configured to be connected fluidically to the hydraulic pump via a first working line and a second working line, (iii) a control valve via which a control pressure medium is configured to be applied to a hydraulic actuating device of the hydraulic pump as a function of a velocity setpoint value, the hydraulic pump configured such that a working pressure of the hydraulic motor or a pressure derived therefrom is effective in a direction of reducing the displacement volume, and a further power branch coupled to the input shaft.

* * * * *